Oct. 8, 1940.　　　　G. L. QUICK　　　　2,217,652
LAMINATING PRESS
Filed May 12, 1937　　　9 Sheets-Sheet 1

Fig. 1.

INVENTOR.
GEORGE L. QUICK
BY
Emery, Varney, Whittemore & Dix
ATTORNEYS.

Oct. 8, 1940.                G. L. QUICK                2,217,652
                          LAMINATING PRESS
                         Filed May 12, 1937          9 Sheets-Sheet 5

Fig. 5.

INVENTOR.
GEORGE L. QUICK
BY
Emery, Varney, Whittemore + Dix
ATTORNEYS.

Oct. 8, 1940.  G. L. QUICK  2,217,652
LAMINATING PRESS
Filed May 12, 1937  9 Sheets-Sheet 7

Fig. 7.

INVENTOR.
GEORGE L. QUICK
BY Emery, Varney,
Whittemore & Dix
ATTORNEYS.

Patented Oct. 8, 1940

2,217,652

UNITED STATES PATENT OFFICE 2,217,652

LAMINATING PRESS

George L. Quick, North Newark, N. J.; Gretta Quick, administratrix of the estate of said George L. Quick, deceased, assignor of one-third to Gretta Quick and two-thirds to George Quick, Bernard Quick, and Ruth Quick Application May 12, 1937, Serial No. 142,177

5 Claims. (Cl. 144—281)

This invention relates to presses, particularly to what is called laminating presses and has for an object the provision of improvements in this art.

Considerable difficulty is experienced at present with laminated material by reason of the fact that in many cases a uniform bond between laminae and uniform surface finish are not obtained throughout the entire area of the material. That is, there may be areas where the surfaces are not baked simultaneously and pressed uniformly, causing uneven surface finishes and poorly bonded laminations. This is especially objectionable where the finished laminated board is used as wall tile, imitation marble or the like where a high gloss is required for architectural appearance, and in cases where the laminated board is used in places having unfavorable environment, as for example where they are exposed to outdoor weathering conditions.

Laminated board usually constructed of layers of paper or cardboard impregnated with phenolic resin and a face ply with some colored or designed paper made in the decalcomania process and having its surface coated with phenolic resin; the layers of paper or cardboard are then placed between two sheets of metal, one sheet having a highly polished face adjacent to the designed surface paper. This unit is then placed in the press and with the combined high pressure of one to two thousand pounds per square inch and high heat, a hard waterproof board results, the face adjacent to the polished sheet having a high gloss.

The failure to secure a good bond throughout the entire area and further failure of an even glossy face throughout the entire area is usually due to deflection of the press members causing uneven distribution of pressure. Likewise if a heated adhesive is used it is obvious that those areas which do not receive adequate pressure or contact with the heated platens, will produce a spotty surface and bond.

To remedy this difficulty it is hereby proposed to place flexible heated platens in contact with the laminated boards. This serves to establish uniform pressure over the entire surfaces by allowing the platens to yield to the general shape of the board as well as the deflection of the press.

According to the present invention pressure members are used which are sufficiently flexible to insure uniform pressure over the entire area. A feature of this invention, therefore, is the manner in which the pressure is distributed and the novel means by which it is accomplished. Another feature is the novel manner of utilizing liquid for the transfer of heat to the hot plates.

Presses heretofore used for this process have been limited as to size due to the difficulty of securing even pressures throughout and the extreme accuracy required in the manufacturing of these presses to obtain uniform pressure even in the smaller sizes prohibits their use in many cases due to their extreme cost. This invention makes it possible to make large presses, capable of doing highly accurate work, at a cost far below that of presses now available for doing the same grade of work. This press has sufficient range for pressing ply-wood, vulcanized rubber products, presswood, fibre products, or the like.

Another feature is the provision of a multi-section press to accommodate boards of various sizes.

Another feature is the provision of novel pressure and heat control means for a multi-unit or segmental press.

Other objects and features of novelty will be apparent from the following description of an illustrative embodiment of the invention, reference being made to the accompanying drawings, wherein.

Laminated boards are made in a number of more or less standard sizes. The platens used for pressing and heating the boards must be as large as the boards. It is unduly expensive for any but the largest plants to have separate presses for each size. It is troublesome and uneconomic to change platens in a press for each change in the size of the boards produced. Moreover, there is a definite limit to the range of platen sizes which a given press can accommodate.

According to the present invention a press is provided with platens which will accommodate the largest size boards which are desired. The press is made in units corresponding to basic standard sizes and increments between standard sizes and each unit is arranged to be independently supplied with curing heat and pressure or with follow-up pressure alone. By follow-up pressure is meant a pressure which will cause those portions of the large pressure platen which are outside the area or unit being employed for pressing and curing boards, to move with the used portion so that no breakage or distortion of the platens will occur.

Figure 1:
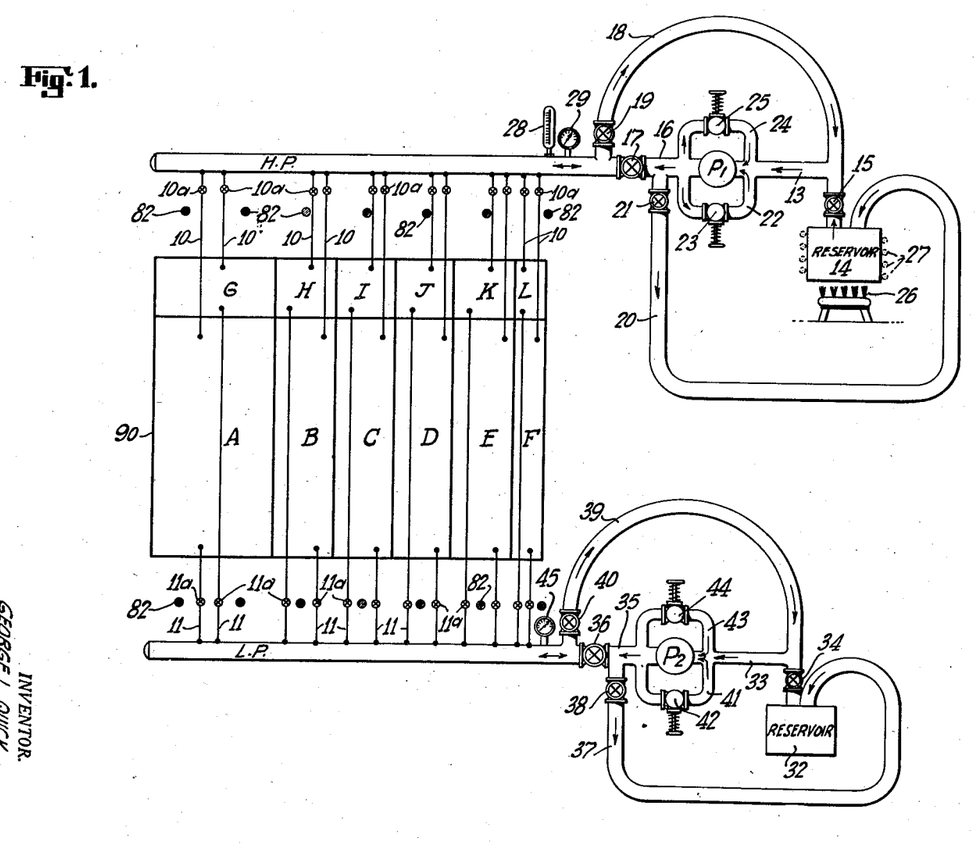
Figure 1 is a schematic plan view of a multiple unit or segmental press and control means therefor.
Figure 2:
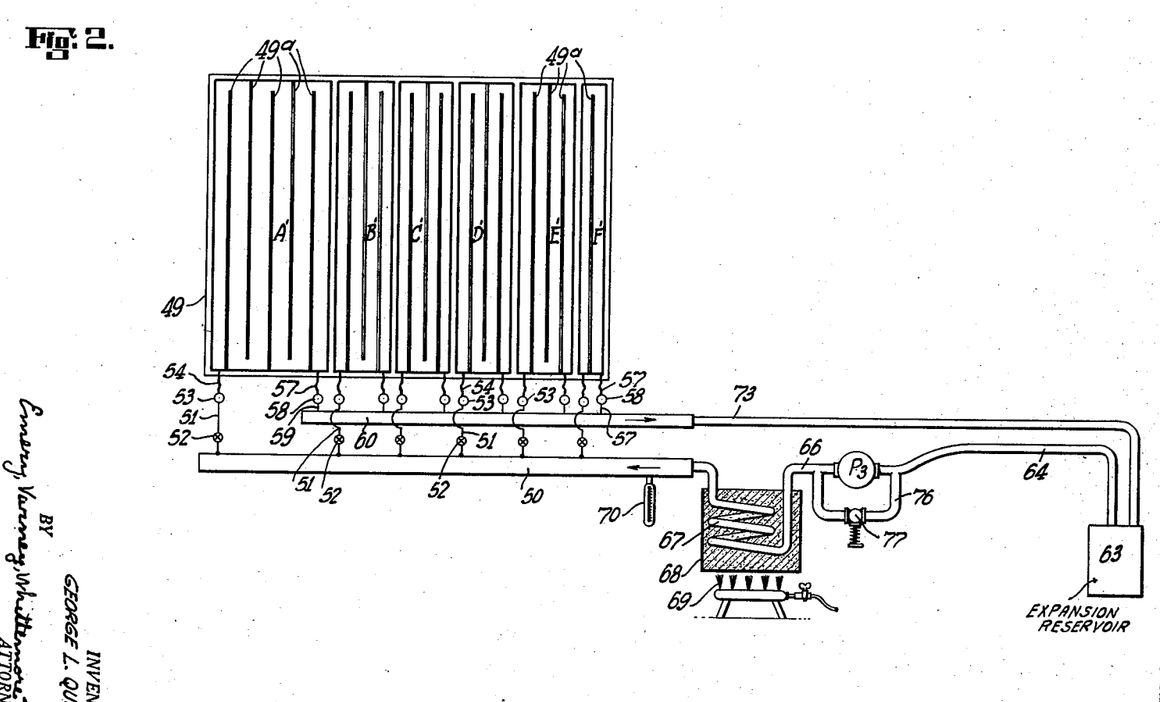
Figure 2 is a schematic plan view of a multiple unit or segmental separating or heating plate and associated parts, some of the segments corresponding to those of Figure 1 being omitted for simplicity.
Figure 3:
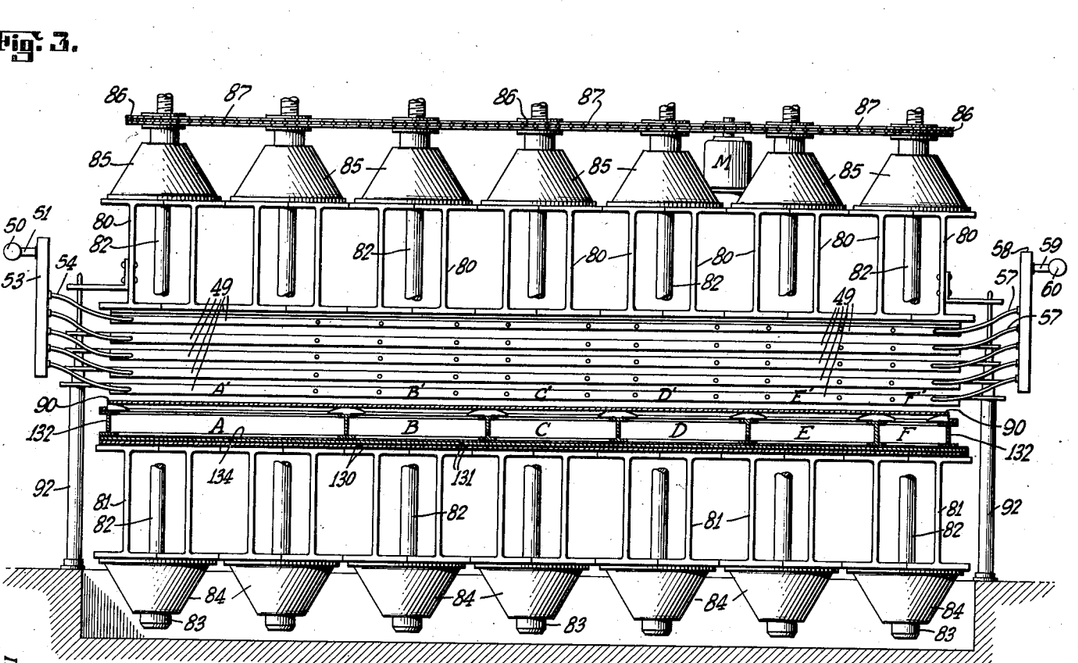
Figure 3 is a side elevation of a multiple unit construction showing the press completely open.

The sectional press is shown in Figures 1 to 3. It may comprise the units A, B, C, D, E, F, arranged side by side and the units G, H, I, J, K, L, arranged at the ends of the units A–F respectively. As an example of the sizes in which the units may be made, the unit A may be 8 feet by 4 feet; the units B–E, 8 feet by 2 feet; the unit F, 8 feet by 1 foot, the unit G, 2 feet by 4 feet; the units H–K, 2 feet by 2 feet; and the unit L, 2 feet by 1 foot. The largest size board which can be made in this press is 10 feet by 13 feet. In this case the platens will be 10 feet by 13 feet. The example given, however, is merely illustrative since there may be as many units as desired and these units may be of any size desired.

The units are each served by a high pressure fluid supply system, which may also supply heat for curing, and a low pressure or follow-up fluid supply system. The high pressure main or header is designated as H. P. and the low pressure main or header as L. P. Pipes 10 each provided with a valve 10a supply and exhaust fluid for the units from the high pressure system; and pipes 11 each provided with a valve 11a supply and exhaust fluid for the units from the low pressure system. If desired, separate headers and pipes may be provided for the supply and exhaust of fluid, this being particularly useful when recirculation of heated fluid is needed.

The high pressure fluid, for example oil, may be circulated by a pump P1. The pump receives fluid through an intake pipe 13 from a reservoir 14. The pipe 13 is provided with a valve 15 which is closed when the pump is acting as an exhaust pump.

The pump supplies fluid to the header through the discharge pipe 16 provided with a valve 17 which is closed when the pump is acting as an exhaust pump.

An exhaust pipe 18 supplies fluid to the pump when the fluid is being withdrawn from the press. The pipe is provided with a valve 19 which is closed when the pump is acting as a pressure pump.

A return pipe 20 carries fluid back to the reservoir 14. The pipe 20 is provided with a valve 21 which is closed when the pump is acting as a pressure pump.

The pump is also provided with a pressure by-pass pipe 22 having a pressure relief valve 23 and a vacuum by-pass pipe 24 having a vacuum relief valve 25.

Fluid in the reservoir is heated by a flame 26, steam coils 27 or any other suitable means. A thermometer 28 is provided for indicating the temperature of the fluid. A pressure gauge 29 is provided for indicating the pressure of the fluid.

The low pressure fluid may be circulated by a pump P2 from a reservoir 32 by way of an intake pipe 33 provided with a valve 34 and a discharge pipe 35 provided with a valve 36.

A return pipe 37 provided with a valve 38 discharges fluid into the reservoir 32 when the pump is acting as a vacuum pump. An exhaust pipe 39 equipped with a valve 40, a pressure by-pass pipe 41 equipped with a pressure relief valve 42 and a vacuum by-pass 43 equipped with a vacuum relief valve 44 are also associated with the pump. A pressure gauge 45 may also be provided.

In operation, fluid is supplied from the high pressure system to the unit or units in which laminated board is placed. This is done by opening the valves 10a of the pipe 10 for the active units, the valves for the other units being kept closed. The pressure may, for example, run from 1000 to 2000 pounds per square inch or more. If the fluid is heated for curing the adhesive it may be, for example, at 200 to 600° F. or above.

To all the inactive or non-pressing units a follow-up pressure is applied by admitting fluid thereto from the low pressure system by opening valves 11a in the pipes 11, the valves for the active units being left closed. The pressure in the low pressure system may be, for example, 5 to 10 pounds per square inch. This pressure will be sufficient to carry the inactive portions of the platen or platens up evenly with the portions thereof which lie in the active units so as to avoid bending stresses in the platens. If there are intermediate platens, as where a number of boards are pressed in a stack, small spaced dummy blocks may be placed between platens in the inactive units.

After the pressure has been applied and the adhesive cured, the platens are separated by operating the proper valves to cause the pumps to remove the fluid and draw a vacuum on the system. The vacuum may be, for example, 18 inches or more of mercury.

When a number of boards are pressed in a stack, novel platen separators made according to the present invention are provided. These platens are preferably heated as by circulating a hot fluid such as oil through them. Fluid from the high pressure system heretofore described may be employed but the intermediate platens are preferably non-expansible so it is not necessary to use fluid under high pressure. In fact, the fluid need only be kept under a pressure of a few pounds, just to make it circulate. The temperature is high enough to cure the selected adhesive. For a phenolic condensation product adhesive a temperature of about 200 to 600° F. may be maintained.

In Figure 2 an intermediate platen 49 for a multiple unit press is shown. The units A', B', C', D', E', F', correspond to the units A, B, C, D, E, F of the pressure platens shown in Figure 1, but the units corresponding to the other units of Figure 1 are omitted for simplicity.

Fluid is circulated by a pump P3 to an inlet header 50 and enters the compartments or units of the platen by the pipes 51 provided with valves 52. In case there are a plurality of platens, the pipes 51 may feed into vertical headers 53 which in turn supply the platen units through the feed tubes 54. The tubes are preferably made flexible to accommodate for movement of the platens.

Fluid is returned from the platen units through flexible return tubes 57, vertical headers 58 and pipes 59 to the exhaust header 60.

The pump initially receives fluid from an expansion reservoir 63 through a supply pipe 64 and delivers the fluid into an inlet pipe 66 connected with the inlet header 50. The pipe 66 may be provided with a coil 67 adapted to be associated with a source of heat to bring the fluid therein to the desired temperature. In order to maintain a uniform temperature the coil 67 may be immersed in a heat transfer material, for example, salt, contained in a vessel 68. Any suitable heating means may be employed, that shown being a gas flame 69. A thermometer 70 may be provided in the header 50 to register the temperature of the fluid supplied to the platens.

Fluid from the exhaust header 60 is returned to the expansion reservoir by the exhaust pipe 73. The pump may be provided with a pressure by-pass 76 equipped with a safety pressure relief valve 77.

In operation, the inlet valve for the unit or units which are to press the boards is opened. The valves for the other units are left closed. If desired, the outlet pipes 59 may also be provided with valves but if not, the only effect is to leave these platen units full of uncirculated fluid. The pump takes fluid from the reservoir 63 and pumps it through the heating coil 67 into the inlet header 50. The fluid returns to the reservoir through the pipe 73. The pump continues to circulate heated fluid to the platens while the boards are being pressed and cured.

In Figure 3 there is shown something of the physical characteristics of the multiple unit press. Here the upper part of the press comprising the very rigid I-beams 80 is shown to be fixed in position while the lower part comprising the very rigid I-beams 81 is mounted for vertical movement from and toward the upper part. A press of fewer, simpler and lighter parts which require little or no machining results from making the lower part instead of the upper part movable.

The lower part may be supported by heavy vertical bolts 82 provided with heads 83 which are secured to mushroom castings 84 which in turn are secured to the I-beams 81. The upper I-beams 80 are surmounted by mushroom castings 85 through which the bolts 82 pass. The upper ends of the bolts are threaded into the hubs of sprocket wheels 86 which may be rotated together by a sprocket chain 87. The position in plan of the bolts 82 is indicated in Figure 1.

The lower part of the press carries the fluid pressure plate 90 and the pressure units A-L. Of these, A-F are shown in Fig. 3. The fluid supply for these units is not shown in Figure 3. The plate 90 may be a part of the fluid pressure means as shown in Figure 3, in which case the pressure fluid will also be heated to a curing temperature; or it may be a separate part secured to the fluid pressure means, in which case the pressure fluid need not be heated and the fluid only circulated below the platen which is heated. In the latter case the part 90 may be formed as a hollow unit and reinforced in a manner to be described later in connection with the intermediate heating platens 49.

The press units, shown diagrammatically in Fig. 1, are located below the press plate 90 with the units being separate from each other and independently operated so that when work is positioned on a certain portion of the plate, high pressure fluid can be introduced into the units directly below that portion and low or follow-up pressure fluid can be introduced into the units below the other portions of the plate to thereby prevent the unused portions of the plate from sagging which might result in the possible breaking of the plate.

The upper heating platen 49 is secured beneath the upper I-beams 80. This may be reinforced and heated by circulated fluid like the other heating units 49.

The platens 49 may be supported in spaced position by posts 92 placed at the ends of the press, the sides being left clear to permit boards to be fed in. These posts have progressive stops or shoulders for the successive platens. Instead of the posts, links or bolts may be employed to suspend the platens from the upper part of the press. Whatever supporting means are used, the platens are spaced apart to permit boards to be fed in when the press is separated and are permitted to come as close together as necessary when the press is closed.

Figure 4:
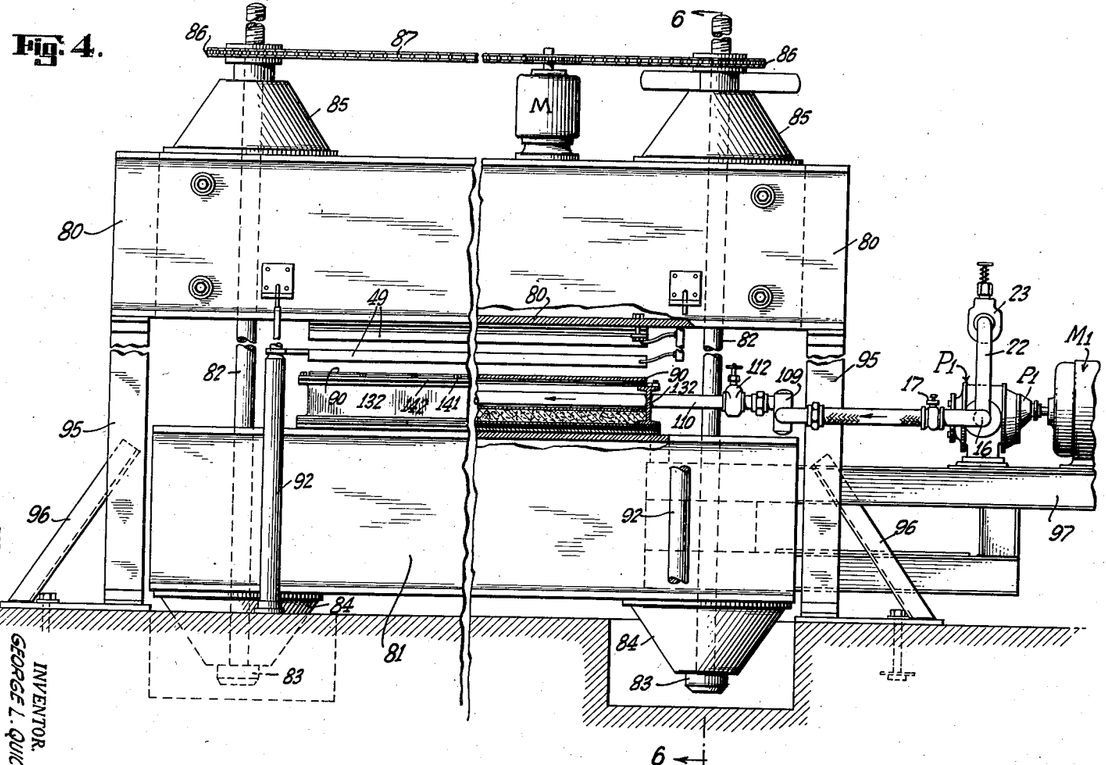
Figure 4 is a side elevation of the apparatus shown in Fig. 3.

As shown in Figure 4, the upper I-beams 80 are supported upon vertical columns 95 secured to the floor and braced if necessary by members 96. The pump P1 driven by a motor M1 is shown in this figure to illustrate how the pump and motor may be mounted upon protruding beams 97 so as to move up and down with the lower part of the press. Only one press section is illustrated in Figure 4 and the associated views 5–9 so it is not necessary here to illustrate the follow-up fluid supply system shown in Figure 1.

Figure 5:
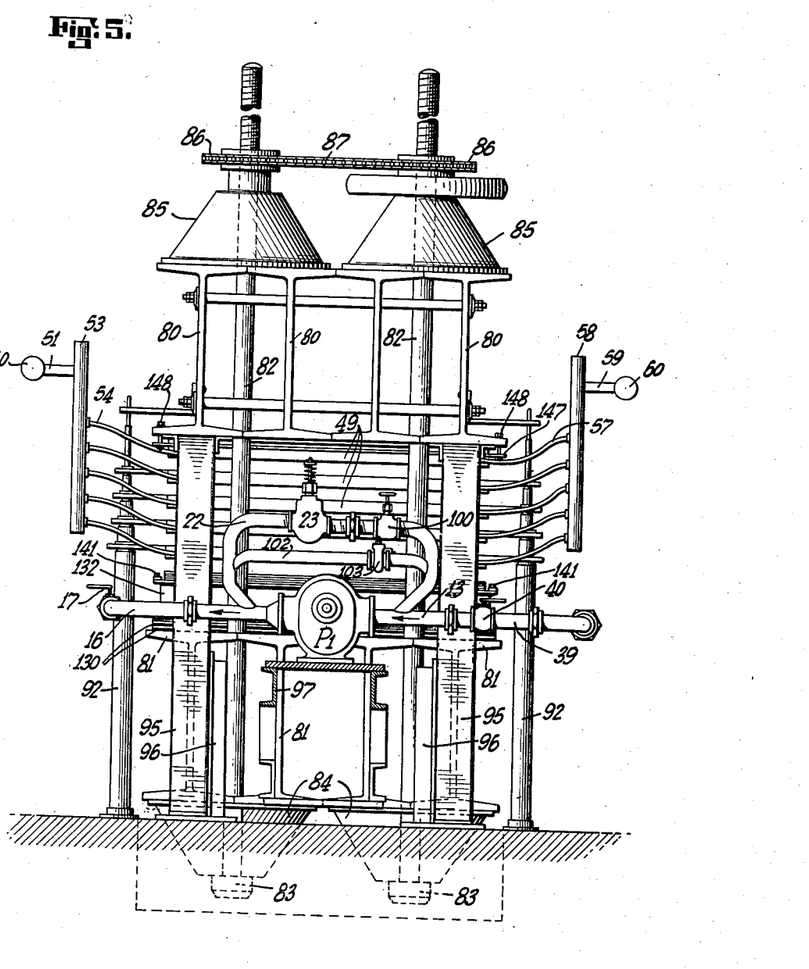
Figure 5 is an end view of one unit of the apparatus shown in Figure 3 and showing the fluid pump and related mechanism.
Figure 7:
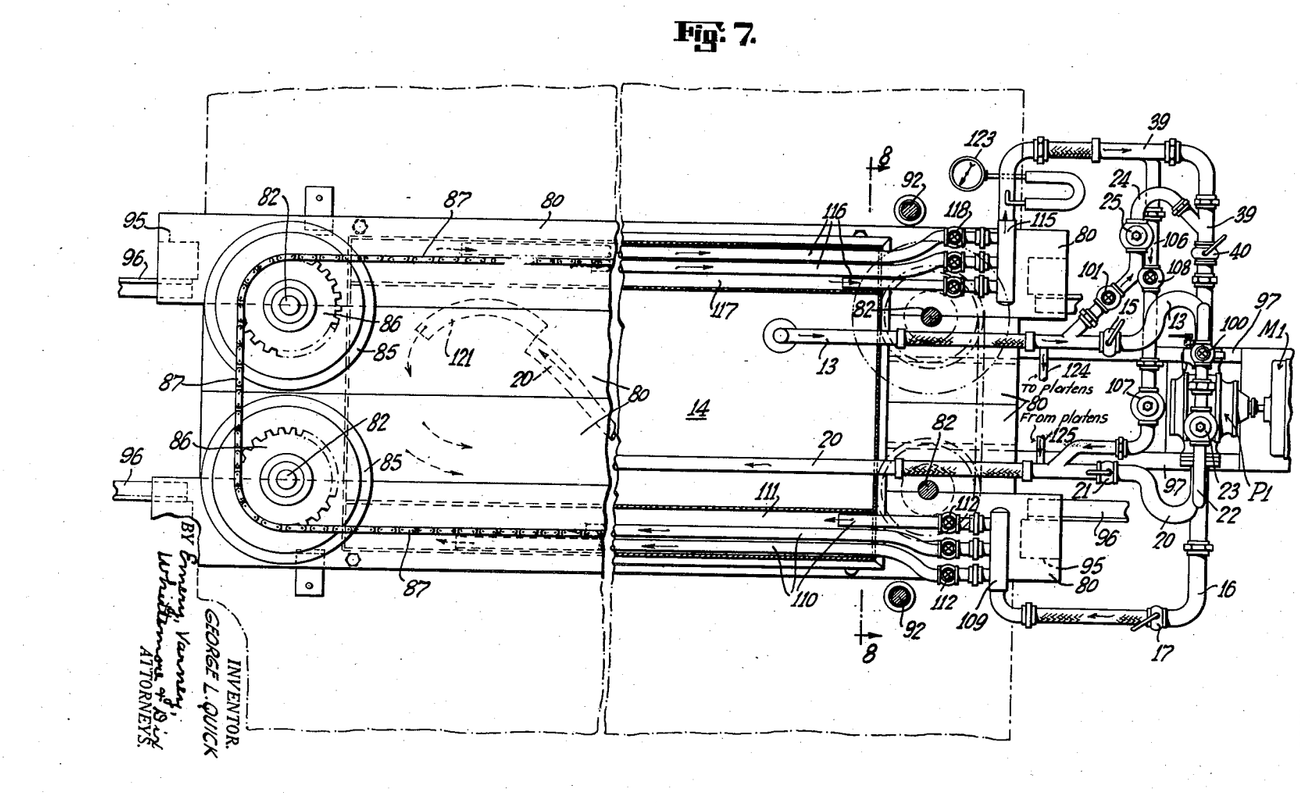
Figure 7 is a plan view partly in section taken on the line 7—7 of Figure 6.

In Figures 5 and 7 the fluid circulatory system associated with the pump P1 is shown. To a large extent this is the same as that shown in Figure 1 but is modified to provide for continuous circulation of heated fluid. As in Figure 1, the pump P1 may initially take fluid from the reservoir 14 by way of the pipe 13 and deliver it by way of pipe 16 to the pressure chamber. The pipe 13 is equipped with the throttle valve 15 and the pipe 16 is provided with the throttle valve 17. Fluid may be returned by the pump to the reservoir by the pipe 20 provided with the throttle valve 21. Fluid is withdrawn from the pressure chamber through the pipe 39 provided with the throttle valve 40. The pump is provided with a pressure by-pass 22 equipped with a pressure relief valve 23. The by-pass is also equipped with a throttle valve 100 which may be closed when pressures higher than that for which the valve 23 is set, are wanted.

A vacuum by-pass 24 is provided with a vacuum relief valve 25 and also with a throttle valve 101 which may be closed when it is desired to draw a greater vacuum than that for which the valve 25 is set. In this case, the vacuum pipe 24 connects with the pipe 13 to supply the pump with fluid from the reservoir instead of from the pressure side of the pump as in Figure 1.

A second vacuum by-pass 102 is provided for the pump P1. This is equipped with a throttle valve 103 which may be operated either by hand or under the control of the vacuum relief valve 25, as by a solenoid and electrical connections (not shown). This provides that when the vacuum reaches the predetermined limit the valve 103 will be opened thus permitting the pump to recirculate fluid around itself rather than to the reservoir and back. When the valve 103 is open the pump is operating under idling conditions and the valve 21 controlling the return to the reservoir may be closed, if desired.

Means are provided for building up pressure and relieving excess pressure during the pressing and curing operation. This means comprises a relief pipe 106 provided with a pressure relief valve 107 and a throttle valve 108.

The supply pipe 16 connects with a header 109 feeding a plurality of pipes 110 of different lengths discharging into the pressure chamber 111 at different points on one side of the reservoir 14. The pipes 110 are provided with valves 112. By having the pipes 110 discharge at different points in the chamber 111 better distribution of fluid and hence of heat and pressure are assured.

The return pipe 39 connects with a header 115 receiving fluid from a plurality of pipes 116 of different length. The pipes 116 remove fluid from a pressure chamber 117 on the other side of the reservoir 14 from the chamber 111. The pipes 116 are provided with valves 118. The provision of outlet pipes 116 of various lengths and the arrangement of inlet and outlet chambers 111 and 117 on opposite sides of the platen produces uniform application and distribution of heat and pressure.

Fluid in the reservoir 14 may be heated (when heating of the pressure fluid is desired) by any desired means such as a flame beneath the reservoir; steam coils, electrical devices or the like. As shown electrical resistor rods 120 are placed in the reservoir and connected with a source of electrical current. Temperature responsive means may be immersed in the fluid and act upon the source of current to control the temperature of the fluid.

The pipe 20 which discharges fluid into the reservoir ejects it against a curved concave baffle plate 121 so as to secure thorough mixing and uniform heating of fluid in the reservoir.

The pipe 39 may be provided with a vacuum gauge 123.

Pipes 124 and 125, connected with the pipes 13 and 20 of the reservoir respectively, may be employed to supply heated fluid to the intermediate platens. Of course, in the system just described the fluid is under pressure, so if pressure in the intermediate platens is not desired the circulatory fluid therefor may be separately supplied as previously suggested.

Figure 8:
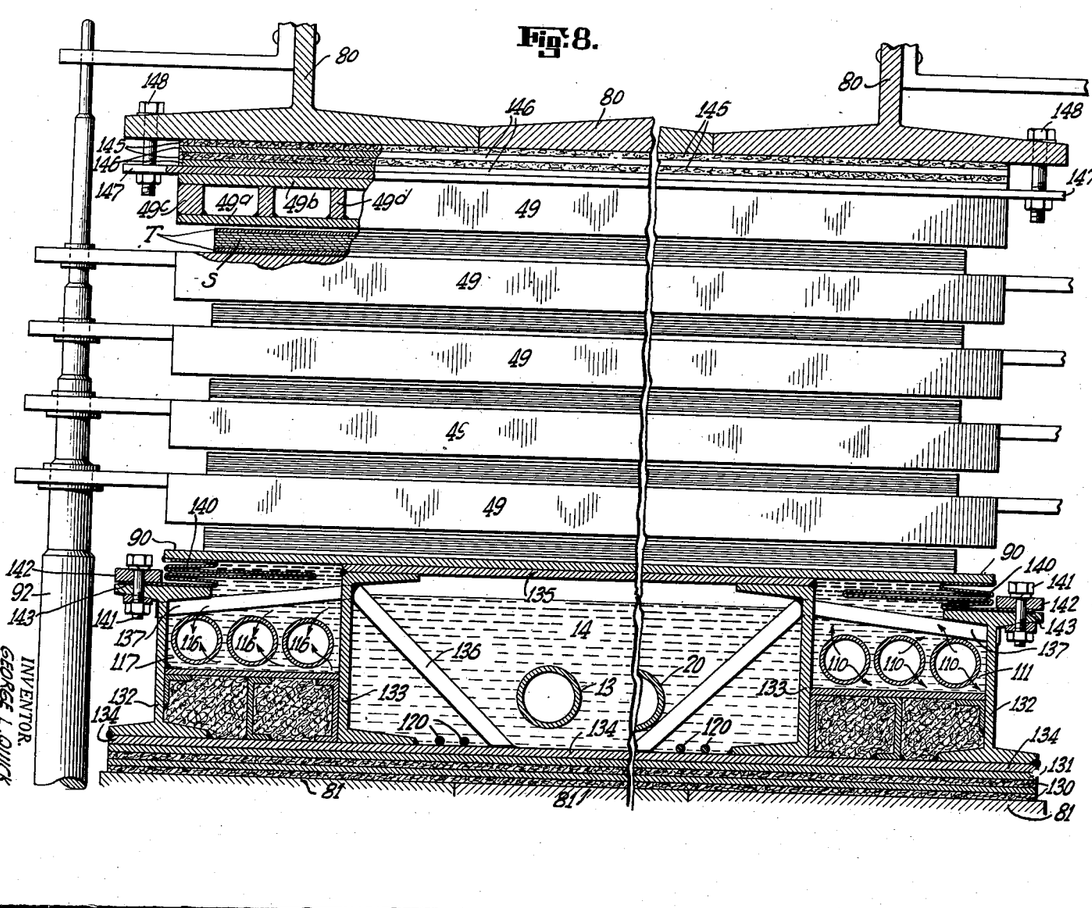
Figure 8 is a vertical section on the line 8—8 of Figure 7 showing the lower portion of the press pulled up ready for the application of pressure.

Details of the press construction are shown in Figure 8. The press unit including the reservoir 14, side pressure chambers 111 and 117 and the pressure plate 90 are mounted on the lower I-beams 81. When the lower press unit is supplied with heated fluid it may be insulated from the I-beams by asbestos sheets 130 and plywood sheets 131. The unit may be formed of I-beams 132, channel beams 133, plates 134, 135, braces 136, stays 137 and other members suitably secured together as by welding or the like.

The plate 90 may be secured in place by a heavy bellows 140 extending completely around its edge. The bellows may consist of a single piece of material on each side bent into a plurality of folds or it may be formed of a plurality of flat sheets welded together at their edges. The bellows may be secured to the plate 90 by welding and to the I-beams 132 by welding, bolting or riveting. Bolting is preferred and illustrated, bolts 141 and metal bars 142 being employed to secure the outturned edge of the bellows to the I-beam. A lead strip 143 may be employed to make a tight seal.

The intermediate platens 49 are also shown in Figure 8. The upper platen 49 is shown partly in section. Laminated boards S between sheets of metal T are shown in position between the platens ready to be pressed. The platens, as shown in section, comprise a lower plate 49a, an upper plate 49b, edge bars 49c and spaced interior bars 49d. The bars 49d provide stiffening in one direction but in order not to make the platens too rigid the bars are not secured to both plates but only to the lower plate, as by welding. The bars 49d do not extend completely across the plates but are staggered as shown in plan in Figure 2 to provide a tortuous path of flow for the heated fluid. The upper plate is free to separate from the bars but under pressure conditions the parts are sealed together forming a closed passage for liquid.

The platens 49 are sufficiently flexible to provide a distributed pressure throughout the entire area of the boards but are not sufficiently thin and flexible to permit of local distortion over small areas such as would cause localized surface irregularities in the boards. Plates of one-quarter inch thick steel are suitable but if much thinner they tend to give local irregularities. The plates may be thicker than one-quarter inch but it is definitely desired to avoid press parts which are rigid throughout the extent of the board area. The bars 49d reinforce the platens and make them solid to pressure through the thickness of the platens but at the same time do not make the platens too rigid insofar as bending in relatively large areas is concerned.

The top platen 49, as shown in Figure 8, may be secured to the upper part of the press and insulated therefrom by a plurality of alternate asbestos boards 145 and ply-wood boards 146. The boards 145 and 146 are secured to the I-beams 80 by a metal plate 147 and bolts 148.

The boards 145, 146 and 147 provide some yield over large areas but practically the upper platen 49 may be said to be rigidly backed over its entire area by the I-beams 80. This, however, is not detrimental because the intermediate platens and the pressure means on the lower side of the press are laterally flexible so as to provide a distributed pressure over all areas of the boards. As a matter of fact, it is very beneficial to provide a solid backing on one side of the press because if both sides were flexible it would not be possible to be assured of obtaining boards which were flat.

Figure 9:
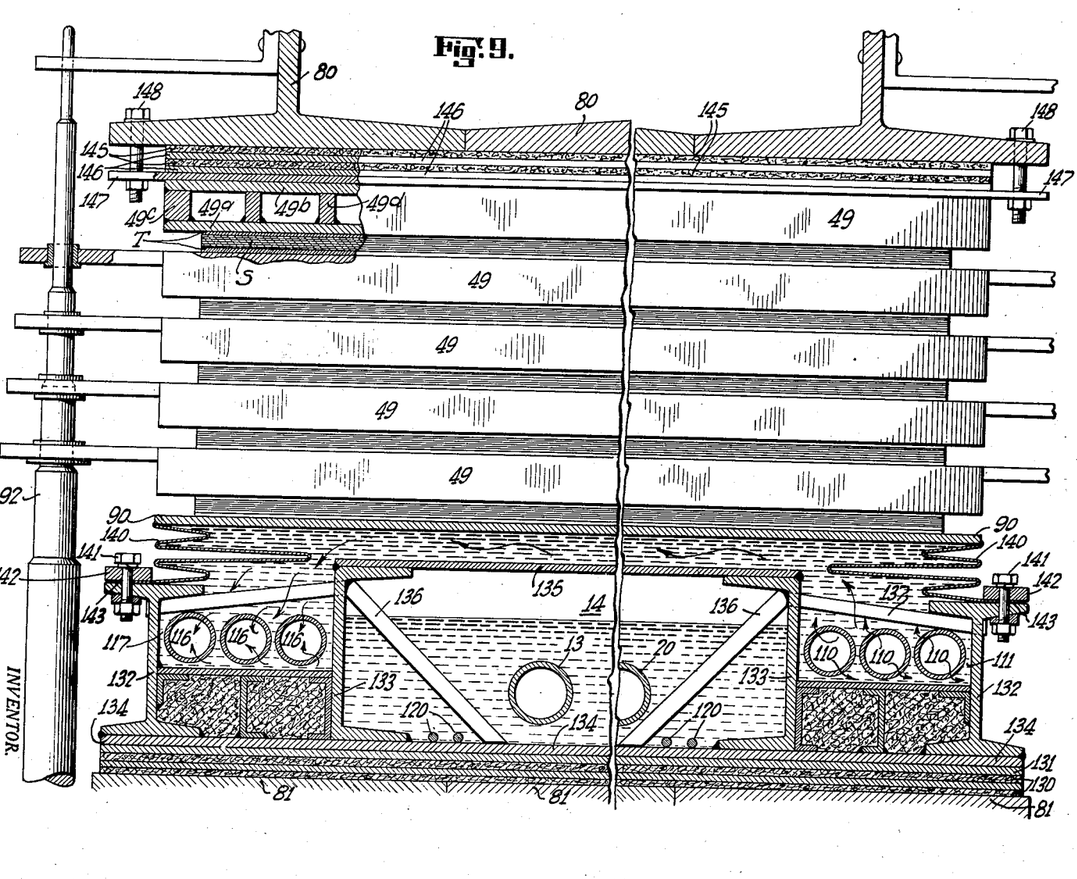
Figure 9 is a similar view after the application of pressure.

The lower press plate 90 likewise is made thick enough to avoid small localized distortion. It may be one-quarter inch thick or thicker. It receives pressure over its entire area as shown in Figure 9. This view shows the press after the final application of pressure. Figure 8 shows it before the application of pressure. In the latter case the intermediate part of the plate 90 rests on the upper reservoir plate 135. As soon as the edges of the plate 90 over the chambers 111 and 117 are raised slightly the pressure fluid enters between the plates 90 and 135 and acts upon the entire area of the former.

If desired, chambers like 111 and 117 may be provided at the ends of the reservoir 14 as well as on the sides, and fluid may be both fed to and discharged from each of the surrounding chambers.

Also, if desired, and as previously suggested a reinforced platen 49 which is separately heated may be used at the bottom of the press. In this case the insulating plates 130 and 131 will be placed between the plate 90 and the bottom platen instead of below the reservoir, because the pressure fluid need not be heated.

In operation, boards are fed into the press between the platens when the press is fully open, as shown in Figure 3. The intermediate platens rest on the shoulders of the successively reduced portions of the posts 92 and in this connection it is to be noted that the reinforced construction of the intermediate platens is a distinct advantage in preventing sag of the same in the center. This is especially true in large size, i. e., large area, presses.

After boards have been introduced, the lower part of the press is pulled up through the bolts 82 as far as it will go. Then fluid pressure is applied on the lower part of the press to close it up from the position shown in Figure 8 to that shown in Figure 9. The press is kept closed until the adhesive has set. In the case of heat-cured adhesive, the platens on all faces of the boards are kept hot by circulating heated fluid through them.

After curing the fluid is removed under vacuum and returned to storage and the press opened again as shown in Figure 3 position and the boards removed.

Figure 6:
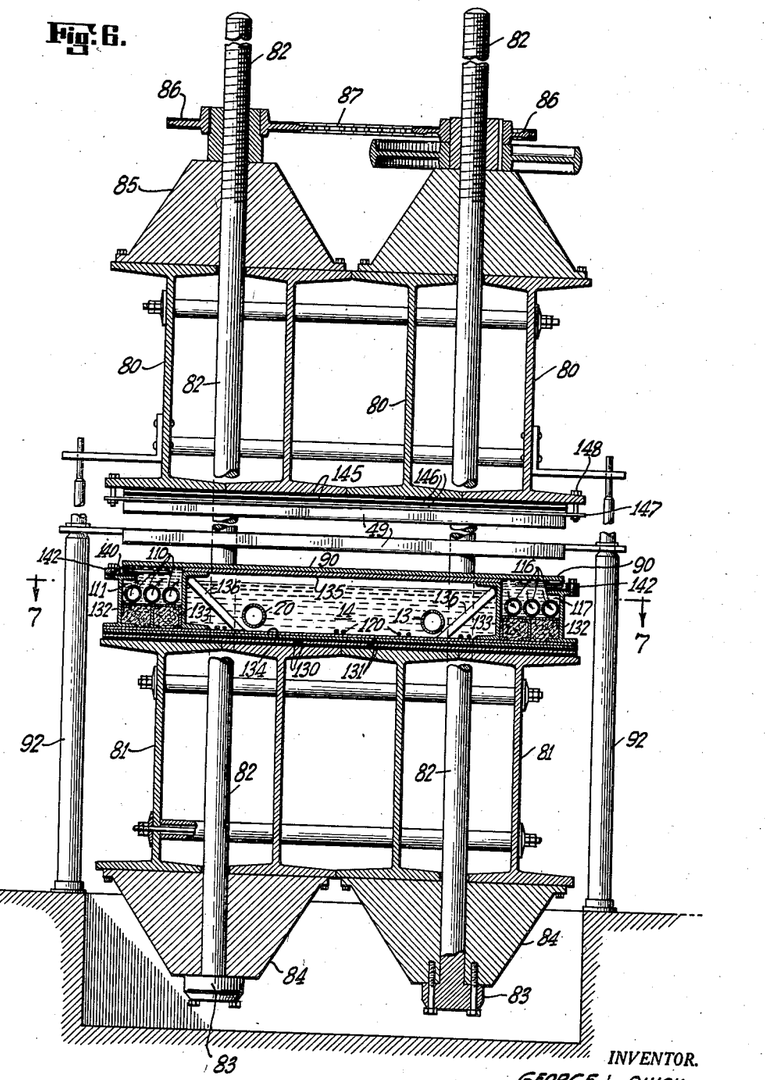
Figure 6 is a vertical sectional view taken on the line 6—6 of Figure 4.

It is believed that the operation in detail of the fluid control system shown in Figures 5 and 6 will be clear from what has been said of the cycle of operation and of the similar systems shown in Fgures 1 and 2.

While certain embodiments of the invention have been described in detail to give a clear understanding of the principles of the invention, it is to be understood that the invention may be variously embodied within the limits of the prior art and the scope of the subjoined claims.

I claim:

1. A board press comprising in combination, a press plate exposed on its entire surface to pressure fluid, fluid chambers at each side edge of said plate opening to said plate, and a fluid reservoir at the intermediate portions of the plate having a top wall separating it from said plate and upon which said plate rests when in its lowermost position.

2. A board press comprising in combination, a press plate, a plurality of adjacent press units acting upon the adjacent face portions of the press plate, and means for selectively applying high compression pressure or low follow-up pressure to each of said units to keep all portions of said plate whether active or idle in the same plane with each other.

3. A board press comprising in combination, separable press sections, a plurality of independent pressure units associated with one of said sections, a platen common to all of said units, said units being disposed side-by-side and together being capable of applying uniform resilient pressure to substantially the entire area of the press platen or to multiple unit parts thereof and each unit being capable of independent operation to apply uniform resilient pressure over the entire area of one unit only and means for furnishing heavy pressure and lighter separate follow-up pressure to each of said units.

4. A board press comprising in combination, opposed separable press sections having surface adjustability toward and from each other, means for moving the press sections relative to each other and a flexible platen associated with said press adapted to engage the surfaces of boards being compressed, said platen comprising two spaced flat parallel plates, spacing members securing said plates together at their edges and separate parallel bar-like reinforcing members disposed in spaced relationship between said plates, each of such reinforcing members being secured to one and one only of said plates.

5. A board press comprising in combination, opposed separable press sections having surface adjustability toward and from each other, means for moving the press sections relative to each other and a flexible platen associated with said press adapted to engage the surfaces of boards being compressed, said platen comprising two spaced flat parallel plates, spacing members securing said plates together at their edges and separate parallel bar-like reinforcing members disposed in spaced relationship between said plates, said reinforcing members being staggered and alternate members having passages at opposite ends to provide a tortuous fluid passage between and around them, each of such reinforcing members being secured to one and one only of said plates.

GEORGE L. QUICK.